United States Patent

[11] 3,596,636

| [72] | Inventor | Bette L. Stobaugh |
| | | Rte. 2, Box 118, Jennings, Okla. 74038 |
| [21] | Appl. No. | 783,474 |
| [22] | Filed | Dec. 13, 1968 |
| [45] | Patented | Aug. 3, 1971 |

[54] PET DRYING ENCLOSURE
2 Claims, 3 Drawing Figs.

[52] U.S. Cl. ................................................ 119/1, 119/160
[51] Int. Cl. .................................................. A01k 29/00, A01k 31/08
[50] Field of Search ........................................ 119/19, 160, 1, 96

[56] References Cited
UNITED STATES PATENTS
3,043,264  7/1962  Felhofer et al. ............... 119/19
3,150,640  9/1964  Nevitt ........................... 119/96
2,170,379  8/1939  Ortt ............................... 119/19 X
3,108,568  10/1963  Whitney et al. ................ 119/160 X
3,150,641  9/1964  Kesh .............................. 119/160
3,156,213  11/1964  Patten ........................... 119/19

FOREIGN PATENTS
10,032  9/1900  Great Britain ................. 119/160

Primary Examiner—Aldrich F. Medbery
Attorney—Head & Johnson

ABSTRACT: A pet drying enclosure is triangularly shaped and includes a substantially rigid floor member, hinged to permit collapsibility to convenient size for storage and travel.

PATENTED AUG 3 1971
3,596,636
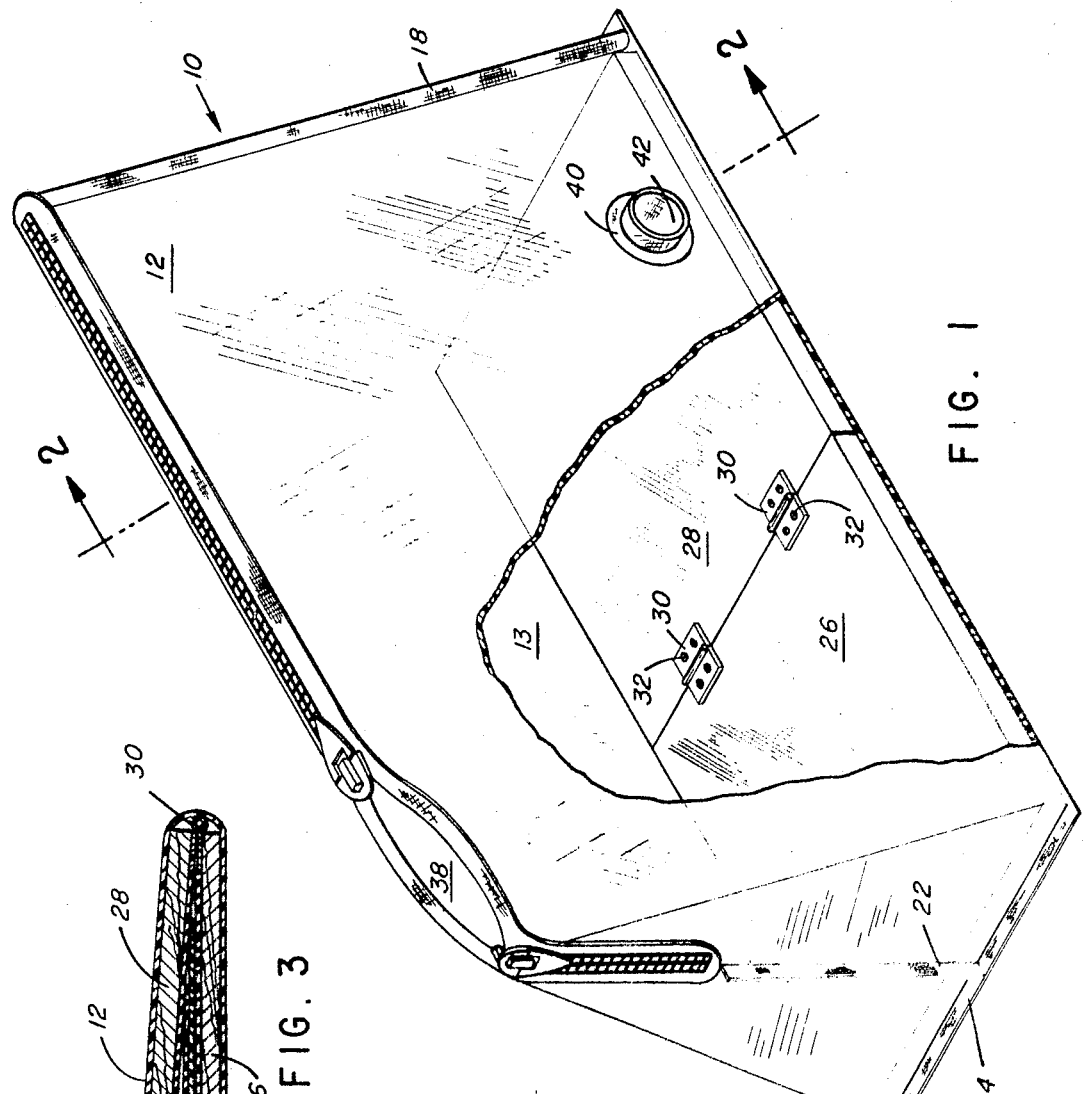
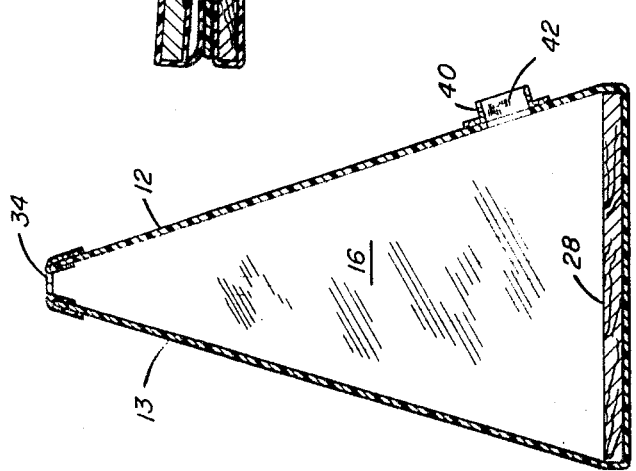
INVENTOR.
BETTE L. STOBAUGH
BY
Head & Johnson
ATTORNEYS

PET DRYING ENCLOSURE

BACKGROUND OF THE INVENTION

This invention pertains to the animal husbandry arts and particularly to equipment and accessories used with domestic pets.

The maintenance, grooming and upkeep of domesticated pets is more common in recent years, especially with long hair and hy-bred pets which necessitate frequent baths. Such pets require thorough drying to prevent illness. Others heretofore in the arts, such as U.S. Pat. Nos. 3, 150, 641 and 3, 108, 568, have taught covers and drying apparatus for pets. However, these devices have caused a greater amount of restraint upon the animal which makes them very uncomfortable and in come cases even more difficult to restrain the animal until dried. Further, it is very difficult using devices such as shown in the prior art in the event the animal desires to assume some other position than a standing position yet have the dryer operate satisfactorily without clogging or excessive back pressure. In addition, it is highly desirable to provide a device which may be easily utilized for enclosing the animal and which can be, after use, collapsed into a neat storage package.

SUMMARY

Accordingly, it is an object of this invention to provide a drying enclosure for pets in which is included provision for attachment of a conventional hair dryer or other portable device and in which the pet may assume either a standing or a sitting or a lying position without interference to the flow of drying air. As such, the invention provides for a triangular-shaped enclosure of flexible material having zippered closures and a relatively rigid base portion which may be easily collapsed when not in use.

BRIEF DESCRIPTIONS OF THE DRAWINGS

FIG. 1 is an isometric view of a pet dryer embodying this invention with a cut away section in the side to shown the hinged base.

FIG. 2 is a cross-sectional view on a line 2–2 showing a wood base and opening for dryer connection.

FIG. 3 depicts the device of this invention as folded.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways; also it is to be understood that the phraseology or terminology employed herein is for permit purpose of description and not of limitation.

Referring now to the drawings in detail, FIG. 1 discloses a pet drying case, generally 10, formed of flexible plastic sides 12 and 13 and ends 14 and 16 fastened together at the corner as by cloth binding 18 and front bindings 22 and 24. THe plastic enclosure envelopes a wood or plastic base in two sections 26 and 28, hinged at 30 in the center to permit compact storage. The hinges 30 are secured to the base with wood screws 32.

The top is closed with a conventional-type zipper 34 and a front zipper 36 leaving an opening 38 which fits around the neck of the pet allowing the head to be free. A sleeve 40 of a heavy cloth material is sewed in the lower side of the case, having an opening 42 for inserting a hose from a hair dryer or similar appliance.

In a typical operation and use of the invention, the base sections 26 and 28 are folded outwardly and, since normally the drying case is already assembled, it will assume a form substantially as shown in FIG. 1. Since the case 10 is formed of a relatively flexible plastic material, which may be transparent, there will be a tendency for it to collapse. The zippered closures 34 and 36 are opened and the pet is inserted within the enclosure so that its head normally protrudes through opening 38. The zippers 34 and 36 are closed and a conventional hair drying outlet is attached to the sleeve 40. In some instances, an absorbent material may be placed on the base sections on which the pet may wish to lie and hence the absorbent material will aid in the drying of the pet. Accordingly, it can be seen that because of the relatively rigid base portions 26 and 28 and because of the relatively flexible case 10 thereabove, the pet may have some freedom in either standing, sitting or lying down within the enclosure without necessarily closing off the opening 42 and the drying air circulating therethrough. After the pet has been dried, the zippers are opened and the pet is removed. The plastic case 10 then folds upon the base portions which are thereafter hinged upon each other to form a relatively compact storage unit as shown in FIG. 3.

What I claim:

1. A drying enclosure for pets comprising a rigid, parallelpiped base member hingeably divided centrally of one side to permit folding to a compact size,
    a transparent, flexible, normally collapsible, case extending upward from said base to form, when drying air is blown thereinto, a polyhedron of triangular cross section,
    closure means extending along a partial length of the edges forming the apex of said case and terminating in opening for the neck of said pet, and
    air conduit connection means on said case adjacent and slightly above said base to blow said drying air into said enclosure.

2. An enclosure of claim 1 wherein the end adjacent the neck closure includes a partial closure extending downwardly from said neck and medially of said end.